United States Patent Office 3,651,103
Patented Mar. 21, 1972

3,651,103
SUBSTITUTED 2-(FLUOREN - 2-YLOXY)-ACETIC ACIDS AND LOWER ALKYL ESTERS THEREOF
Gerhard Baschang, Bettingen, Charles J. Morel, Arlesheim, and Oskar Wacker, Binningen, Switzerland, assignors to Geigy Chemical Corporation, Ardsley, N.Y.
No Drawing. Filed Sept. 24, 1969, Ser. No. 860,827
Claims priority, application Switzerland, Sept. 25, 1968, 14,335/68
Int. Cl. C07c 69/76; C11c 3/00
U.S. Cl. 260—413
3 Claims

ABSTRACT OF THE DISCLOSURE

Compounds of the class of substituted 2-(fluoren-2-yloxy)- and 2-(fluoren-2-ylthio)-acetic acids, as well as lower alkyl esters and alkali and alkaline-earth metal salts thereof have hypolipemic activity; they are active ingredients of pharmaceutical compositions and are useful for treating hyperlipemic conditions in warm-blooded animals.

DETAILED DESCRIPTION

The present invention relates to substituted fluorenyl-oxy and fluorenylthio acetic acids, lower alkyl esters and alkali and alkaline-earth metal salts thereof, pharmaceutical compositions containing these compounds and their use.

More particularly the present invention relates to compounds of the formula

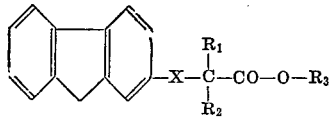

(I)

wherein $R_1$ is a straight or branched alkyl having at most 10 carbon atoms, cycloalkyl having 5 to 7 ring members, or benzyl;
$R_2$ is hydrogen or methyl;
$R_3$ is hydrogen or lower akyl having 1 to 3 carbon atoms; and
X is oxygen or sulfur;

and to alkali or alkaline-earth metal salts thereof, when $R_3$ is hydrogen.

The present invention concerns also pharmaceutical compositions comprising a compound according to Formula I or an alkali or alkaline-earth metal salt of an acid corresponding to Formula I and an inert pharmaceutical carrier.

The present invention further concerns a method of treating hyperlipemic conditions in warm-blooded animals comprising administering thereto a hypolipemically effective amount of a compound of Formula I or of an alkali or alkaline-earth metal salt of a carboxylic acid of Formula I.

In the compounds of Formula I, $R_1$ as alkyl having at most 10 carbon atoms is, e.g. the methyl, ethyl, propyl, butyl, isobutyl, pentyl, isopentyl, neopentyl, hexyl, isohexyl, 3,3-dimethylbutyl, heptyl, octyl, nonyl or decyl group, and as cycloalkyl group having 5 to 7 ring members $R_1$ is, e.g. the cyclopentyl, cyclohexyl or cycloheptyl group. As lower alkyl group, $R_3$ is, e.g. the methyl, ethyl, propyl or isopropyl group.

Especially valuable are compounds of Formula I, wherein $R_1$ is straight or branched alkyl having from 3 to 10 carbon atoms, cycloalkyl having 5 to 7 ring members, or benzyl; $R_2$ is hydrogen or methyl; or wherein both $R_1$ and $R_2$ are methyl; $R_3$ is hydrogen or lower alkyl having 1 to 3 carbon atoms; X is oxygen or sulfur; and an alkali or alkaline-earth metal salt thereof when $R_3$ is hydrogen.

Typical members of compounds of the invention are, for example, 2-(fluoren - 2 - yloxy)-heptanoic acid, 2-(fluoren-2-yloxy)-octanoic acid, 2-(fluoren-2-ylthio)heptanoic acid and 2-(fluoren-2-ylthio)-dodecanoic acid, the corresponding ethyl esters and the sodium salts thereof.

The new compounds of Formula I and the alkali and alkaline-earth metal salts of the free carboxylic acids, embraced by this formula, are produced by reacting an alkali metal salt of a compound of Formula II,

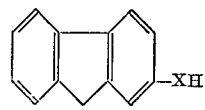

(II)

wherein X has the meaning given under Formula I, with a salt or a lower alkyl ester regarding the carboxyl group of a reactive ester with respect to the 2-hydroxy group of a compound of Formula III,

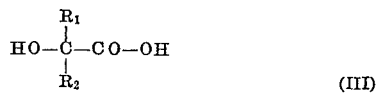

(III)

wherein $R_1$ and $R_2$ have the meaning given under Formula I, optionally liberating, in the case of using a salt as starting material, the carboxylic acid from the initially obtained salt of a carboxylic acid embraced by Formula I and, optionally, converting the free carboxylic acid into an alkali or alkaline-earth metal salt or, by double reaction, converting directly the initially obtained salt into another alkali or alkaline-earth metal salt.

In the case of the reactive esters with respect to the 2-hydroxy group of compounds of Formula III, these are, e.g. halides, i.e. 2-halogen-alkanoic acids embracing 2-halogen-propionic acids up to 2-halogen-dodecanoic acids. Further embraced are α-halogen-cycloalkane-acetic acids, and α-halogen-hydrocinnamic acids, as well as corresponding arenesulphonyloxy compounds and methanesulphonyloxy compounds such as, e.g. 2-arenesulphonyl-oxyalkanoic acids and 2-methanesulphonyloxyalkanoic acids. For the reaction according to the process, either salts are used, e.g. alkali salts, such as sodium or potassium salts, of the aforementioned acids or lower alkyl esters thereof, particularly ethyl, methyl, propyl, or isopropyl esters, e.g. 2-halogen-alkanoic acid ethyl ester. Many such compounds are known, e.g. numerous 2-bromoalkanoic acids and 2-bromoalkanoic acid ethyl esters. Others can be produced analogously to the known compounds. The reaction is carried out preferably in a solvent or diluent, e.g. in a lower, optionally hydrous alkanol, such as ethanol, or in a solvent free of hydroxyl groups, such as dimethylformamide, dimethylacetamide or hexamethylphosphoric acid triamide, at temperatures between ca. 50–150° or up to the boiling point of the applied solvent or, if necessary, also above the boiling point in a closed vessel. The formation of the alkali salt of the fluoren-2-ol, required as direct reaction component, as well as of the optionally required salts of free carboxylic acids, e.g. 2-halogen-alkanoic acids, is preferably performed in situ, e.g. by addition of an alkali metal alcoholate or of an alkali metal hydroxide or -hydride depending on whether an anhydrous alkanol, a hydrous alkanol or dimethylformamide or another solvent, free of hydroxyl groups, is used as reaction medium.

According to a second process, the free carboxylic acids and their alkali and alkaline-earth metal salts, embraced by Formula I, are obtained by hydrolysing a compound of Formula IV

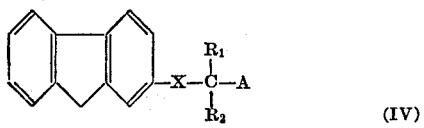

wherein

X, $R_1$ and $R_2$ have the meaning given under Formula I and

A is a carboxyl group esterified with a lower alkanol, cyclohexanol, phenol, or benzylalcohol, a nitrilo group, a carbon amide group or an imidoalkyl ester group, optionally liberating the carboxylic acid from an obtained salt and, optionally, converting this carboxylic acid into an alkali or alkaline-earth metal salt, or directly converting the initially obtained salt into another alkali or alkaline-earth metal salt. The hydrolysis is performed, for example, by heating in alkanoic or aqueous-alkanoic alkali hydroxide solutions to temperatures between ca. 50° and the boiling temperature of the applied reaction medium.

The corresponding pure alkali salts can be obtained from the thereby initially obtained alkali salt solutions of acids of Formula I either directly by concentrating by evaporation and recrystallising, or the acids can be firstly liberated, then purified, e.g. by recrystallisation, and optionally converted into alkaline earth metal salts or again into alkali salts. Functional derivatives of carboxylic acids, embraced by Formula I, can moreover be hydrolysed also in acid medium, e.g. by boiling in 60 to 70% sulphuric acid or in a mixture of concentrated hydrochloric acid and glacial acetic acid, to obtain the free carboxylic acids.

The lower alkyl esters, usable as starting materials, are embraced, like the free carboxylic acids obtained therefrom according to the present process, by the above defined Formula I and are accordingly obtainable by the first mentioned process for the production of the compounds of Formula I. Other esters are produced fully analogously. The nitriles of the carboxylic acids, desired as end materials, can likewise be produced analogously by using α-halogen nitriles, e.g. 2-halogen alkane nitriles, α-halogen cycloalkane acetonitriles, or α-halogen hydrocinnamonitriles. Nitriles usable for the hydrolysis, wherein $R_2$ represents hydrogen, are however also obtainable from the below mentioned, substituted (fluoren-2-yloxy)- and (fluoren-2-ylthio)-cyanoacetic acid alkyl esters by partial hydrolysis with the equimolecular amounts of aqueous-alkanoic alkali solution, liberation of the formed, substituted cyanoacetic acids and decarboxylation by heating. Instead of hydrolysing the stated nitriles directly to the free carboxylic acids or their alkali salts, desired as end materials, they can also be firstly partially hydrolysed to the corresponding amides or converted by the successive action of hydrogen chloride and a lower alkanol into corresponding lower imidoalkyl esters or their hydrochlorides, i.e. into further functional derivatives of carboxylic acids, embraced by Formula I, which are suitable for hydrolysis to the latter.

Instead of using homogeneous lower alkyl esters, amides or nitriles of carboxylic acids embraced by Formula I, it is also possible to use for the hydrolysis according to the process, mixtures thereof with the carboxylic acids desired as end materials, such as are obtained under certain reaction conditions in the case of the hydrolysis of the below mentioned, substituted (fluoren-2-yloxy)- or (fluoren-2-ylthio)-malonic acid dialkyl ester of -cyanoacetic acid alkyl ester and decarboxylation of the crude hydrolysis products. For example, a mixture consisting of a carboxylic acid embraced by Formula I and the corresponding amide is obtained by refluxing for some hours an ethanolic solution of a substituted cyanoacetic acid alkyl ester of the below given Formula V with an excess, i.e. with appreciably more than the equimolar amount, of potassium hydroxide. Cooling and acidifying allows isolating another mixture consisting of the carboxylic acid embraced by Formula I, the amide thereof and the corresponding substituted malonamide acid. This latter mixture is heated, e.g. boiled for a short time in xylene, whereby the malonamide acid is decarboxylated, to give the above-mentioned mixture consisting of the carboxylic acid and the amide thereof.

According to a third process, carboxylic acids of Formula I wherein $R_2$ is hydrogen, and their salts are produced by heating a compound of Formula V

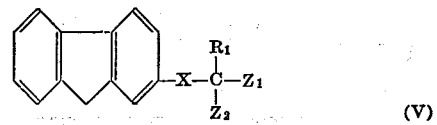

wherein $Z_1$ and $Z_2$ are independently of each other, lower alkoxycarbonyl or cyano groups and $R_1$ and X have the meaning given under Formula I, with an inorganic or organic base or with an inorganic acid, until the group $Z_2$ is replaced hydrogen and the group $Z_1$ is completely hydrolysed, optionally liberating from a salt obtained when a base was used, the carboxylic acid embraced by Formula I and, optionally, converting the latter into an alkali or alkaline-earth metal salt, or connecting directly the initially obtained salt into another alkali or alkaline-earth metal salt. For example, substituted (fluoren - 2 - yloxy)- or (fluoren - 2 - ylthio)-malonic acid dialkyl esters are refluxed for some hours either with excess alkanolic alkali solution, e.g. with methanolic potassium hydroxide solution, or with a mixture of 60 to 70% sulphuric acid or concentrated hydrochloric acid with glacial acetic acid. The conversion of the substituted (fluoren-2-yloxy)- or (fluoren-2-ylthio)-cyanoacetic acid alkyl ester and substituted (fluoren-2-yloxy)- or (fluoren-2-ylthio)-malonitriles, likewise embraced by Formula V, is carried out analogously, but under more rigorous conditions, e.g. with longer reaction times and/or at higher temperature in a closed vessel.

The substituted (fluoren-2-yloxy)- and (fluoren-2-ylthio)-malonic acid dialkyl esters, -cyanoacetic acid alkyl esters and -malonitriles are, for their part, new compounds. They can be produced, for example, analogously to the monocarboxylic acid alkyl esters of Formula I, by reaction of bromo or chloromalonic acid dialkyl esters, -cyanoacetic acid alkyl esters and -malonitriles, substituted according to the definition for $R_1$, with alkali metal salts of the fluoren-2-ol or fluoren-2-thiol, e.g. in absolute ethanol at boiling temperature or under the further reaction conditions given in the case of the first process for the production of the compounds of Formula I. Of the bromo or chloro compounds required for the stated reaction, some are known, e.g. the bromobutylmalonic acid diethyl ester [J. Am. Chem. Soc. 44, 1578–1581 (1922)], and other are obtainable by halogenation analogously to the sythesis of the known compounds.

A fourth process for the production of compounds of Formula I wherein $R_2$ is hydrogen and the alkali and alkaline-earth metal salts thereof consists in heating a compound of Formula VI,

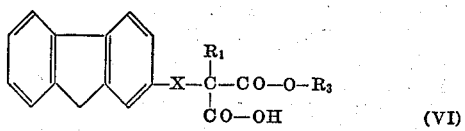

wherein $R_1$, $R_3$ and X have the meaning given under Formula I, or an acid alkali or alkaline-earth metal salt of a dicarboxylic acid of Formula VI, until the equimolar amount of carbon dioxide is split off and, optionally, converting the free monocarboxylic acid, obtained in using a free dicarboxylic acid, into an alkali or alkaline-earth metal salt. For example, a compound of Formula VI, or an acid salt thereof, is heated to temperatures between 130–200°, until the evolution of carbon dioxide is finished. Optionally, the decarboxylation is promoted by the addition of catalysts such as, e.g. copper powder, or organic bases such as, e.g. quinoline. The dicarboxylic acids embraced by ($R_3$=hydrogen) are obtained, for example, by hydrolysing their lower alkyl esters with alkanolic or aqueous-alkanolic potassium hydroxide solution or sodium hydroxide solution, at moderately elevated temperatures, and subsequent acidification. With the use of the merely equimolar amounts of potassium or sodium hydroxide solution, the corresponding monoalkyl esters ($R_3$=lower alkyl group) are obtained.

Instead of pure dicarboxylic acids or dicarboxylic acid monoalkyl esters of Formula VI, it is also possible to use for the decarboxylation according to the invention, a crude hydrolysis product consisting of a dicarboxylic acid dialkyl ester and a certain proportion (formed during hydrolysis and processing) of the desired end material of Formula I.

Optionally obtainable alkali and alkaline-earth metal salts of carboxylic acids embraced by Formula I are, e.g. their sodium, potassium, lithium, magnesium and calcium salts. These salts are produced, e.g. by adding together acid and base in a suitable solvent such as, e.g. methanol, ethanol, acetone/water, optionally filtering off a directly precipitated salt, or one precipitated after addition of a second liquid, or concentrating the salt solution by evaporation. Furthermore, salts which are relatively difficulty soluble in the solvent used can be produced also by double reaction of another salt of the acid with the base or with a suitable salt thereof.

The compounds of the present invention have been found to have valuable pharmacological properties. In particular, they exhibit hypolipemic activity which can be shown for example by the lowering of cholesterol and triglyceride levels in blood and liver of experimental animals on repeated oral administration.

The hypolipemic activity of the compound of the invention is illustratively demonstrated in rats according to the following method:

To a group of ten male Wistar SPF rats each weighing between 120 and 130 g. and fed with a standardised diet and water ad libidum is administered orally through an esophageal sound a 2.5% suspension of 2-(fluoren-2-yloxy)-heptanoic acid in 1% gum arabic. The active compound is administered this way in a daily dosage of 2 x 50 mg./kg. on four consecutive days. The animals are abstained from food the last sixteen hours of the experiment and then sacrificed. Extraction of serum and liver lipids is carried out according to Folch et al., J. Biol. Chem. 226, 497 (1957). Triglycerides and cholerterol are determined with an autoanalyser according to the methods of Kessler and Lederer, Technicon Symposium, vol. I, page 863 (1965) and Block et al. ibid page 970, respectively. The lipid content of this group is compared with the lipid content of a control group. Thus it is shown that 2-(fluoren-2-yloxy)-heptanoic acid lowers the cholesterol and triglyceride levels of serum and liver to a very significant extent. The toxicity of the compound of the invention on oral administration as demonstrated in mice, rats, guinea pigs and rabbits is of very low order. Another advantage is that the compounds have a long duration in the plasma.

These favorable properties render the compounds of the invention suitable for the treatment of hyperlipemic conditions in warm-blooded animals.

The compounds of Formula I and the alkali and alkaline-earth metal salts of the free carboxylic acids, embraced by this formula, can be administered orally or rectally.

The daily dosages vary between 1 and 10 mg./kg., preferably 4–10 mg./kg. warm-blooded animal. Suitable dosage units such as dragées, tablets, suppositories, preferably contain as active substance 10–250 mg., e.g. 50 or 100 mg. of a compound of the general Formula I or of an alkali or alkaline-earth metal salt of a free carboxylic acid embraced by the general Formula I.

In dosage units for oral administration, the content of active substance is preferably between 10% and 90%. Such dosage units are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium stearate or calcium stearate, or polyethylene glycols, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. for distinguishing varying dosages of active substance. Also suitable as oral dosage units are hard gelatine capsules as well as soft closed capsules made from gelatine and a softener, such as glycerin. The former preferably contain the active substance as a granulate in admixture with lubricants such as talcum or magnesium stearate and, optionally, stabilisers such as sodium metabisulphite ($Na_2S_2O_5$) or ascorbic acid. In soft capsules, the active substance is preferably dissolved or suspended in suitable liquids, such as liquid polyethylene glycols, whereby stabilisers can likewise be added.

Suitable dosage units for rectal administration are, e.g. suppositories consisting of a combination of an active substance with a suppository filler material based on natural or synthetic triglycerides (e.g. cocoa butter), polyethylene glycols or suitable higher fatty alcohols, and gelatine rectal capsules containing a combination of the active substance with polyethylene glycols.

The following examples further illustrate the production of the compounds of Formula I and of salts thereof, but the examples in no way limit the scope of the invention. The temperatures are given in degrees centigrade.

EXAMPLE 1

(a) In a round-bottom flask, provided with reflux condenser, drying tube containing potassium hydroxide, and gas inlet tube, 6.0 g. (0.033 mol) of fluoren-2-ol are added under nitrogen to a solution of 0.76 g. (0.033 mol) of sodium in 70 ml. of absolute ethanol. To the thus obtained solution of the sodium-fluoren-2-olate are added dropwise 8.2 g. (0.0346 mol) of 2-bromoheptanoic acid ethyl ester and the whole is refluxed for 3 hours. The reaction mixture is concentrated by evaporation in vacuo, the residue distributed between water and ether and the ether phase extracted by shaking three times with 0.5 N sodium hydroxide solution. After washing with water until the pH-value is 7 and drying with magnesium sulphate, the ether solution is concentrated by evaporation, whereby 10.4 g. of a dark yellow oil are obtained, which crystallises. The crude 2 - (fluoren - 2 - yloxy)-heptanoic acid ethyl ester, which is still contaminated with fluoren-2-ol, is dissolved in 50 ml. of benzene. The benzene solution is chromatographically fractionated by means of a column of 200 g. of silica gel (Merck, grain size 0.05–0.2 mm.). The benzene fractions, containing the desired ester, are combined and concentrated by evaporation. 10.1 g., 90.6% of the theoretical value, of 2-(fluoren-2-yloxy) - heptanoic acid ethyl ester are obtained. After recrystallisation from benzene (B.P. 65–100°), the substance melts at 58–61°.

The following are obtained analogously:

from 4.0 g. (0.022 mol) of fluoren-2-ol and 4.40 g. (0.023 mol) of 2-bromobutyric acid ethyl ester, the 2-(fluoren-2-yloxy)-butyric acid ethyl ester (crude product);
from 4.0 g. (0.022 mol) of fluoren-2-ol and 6.45 g. (0.023 mol) of 2-bromodecanoic acid ethyl ester, the 2-(fluoren - 2 - yloxy)-decanoic acid ethyl ester (crude product);

from 4.4 g. (0.024 mol) of fluoren-2-ol and 7.06 g. (0.023 mol) of 2-bromododecanoic acid ethyl ester, the 2-(fluoren-2-yloxy) - dodecanoic acid ethyl ester (crude product);

from 5.5 g. (0.03 mol) of fluoren-2-ol and 5.43 g. (0.032 mol) of 2-bromopropionic acid ethyl ester, 6.7 g. (78.6% of theoretical value) of 2-(fluoren-2-yloxy)-propionic acid ethyl ester, $n_D^{19°}$: 1.5869; from 11.0 g. (0.06 mol) of fluoren-2-ol and 12.5 g. (0.064 mol) of 2-bromo-2-methylpropionic acid ethyl ester, 9.7 g. (55% of theoretical value) of 2-(fluoren-2-yloxy)-2-methyl-propionic acid ethyl ester, M.P. 63–64° (from methanol);

from 5.0 g. (0.0275 mol) of fluoren-2-ol and 6.26 g. (0.03 mol) of 2-bromovalerianic acid ethyl ester, 6.0 g. (70.4% of theoretical value) of 2-(fluoren-2-yloxy)-valerianic acid ethyl ester, M.P. 55–57° (from methanol/water);

from 5.5 g. (0.03 mol) of fluoren-2-ol and 7.15 g. (0.032 mol) of 2-bromohexanoic acid ethyl ester, 6.4 g. (66% of theoretical value) of 2-(fluoren-2-yloxy)-hexanoic acid ethyl ester, M.P. 64–65° (from methanol);

from 5.5 g. (0.03 mol) of fluoren-2-ol and 8.03 g. (0.032 mol) of 2-bromo-5,5-dimethyl-hexanoic acid-ethyl ester, 9.6 g. (91% of theoretical value) of 2-(fluoren-2-yloxy)-5,5-dimethyl-hexanoic acid ethyl ester, M.P. 62–63° (solidified);

from 5.5 g. (0.03 mol) of fluoren-2-ol and 7.6 g. (0.032 mol) of 2-bromoisoheptanoic acid ethyl ester, 5.6 g. (55% of theoretical value) of 2-(fluoren-2-yloxy)-iso-heptanoic acid ethyl ester, M.P. 58–60° (from methanol);

from 5.5 g. (0.03 mol) of fluoren-2-ol and 8.03 g. (0.032 mol) of 2-bromooctanoic acid ethyl ester, 8.5 g. (80% of theoretical value) of 2-(fluoren-2-yloxy)-octanoic acid ethyl ester, M.P. 53–54° (from methanol);

from 5.5 g. (0.03 mol) of fluoren-2-ol and 7.53 g. (0.032 mol) of α - bromocyclopentaneacetic acid ethyl ester, 3.85 g. (34.4% of theoretical value) of α-(fluoren-2-yloxy)-cyclopentaneacetic acid ethyl ester, M.P. 64–66° (from methanol/water);

from 11.0 g. (0.06 mol) of fluoren-2-ol and 16.9 g. (0.064 mol) of α-bromohydrocinnamic acid ethyl ester, 6.9 g. (32% of theoretical value) of α-(fluoren-2-yloxy)-hydrocinnamic acid ethyl ester, M.P. 98–100° (from methanol/water).

EXAMPLE 2

In a round bottom flask provided with stirrer and reflux condenser a solution of 0.88 g. (0.022 mol) sodium hydroxide in 3 ml. water are added to a mixture of 4.2 g. (0.022 mol) p-toluene sulphonic acid chloride and 2.36 g. (0.02 mol) 2-hydroxy-propionic acid ethyl ester within 4 hours, whilst the temperature is kept at 25–28°. The mixture thus obtained is stirred for 4 hours and then 3.65 g. (0.02 mol) fluoren-2-ol and 1.66 ml. 12 N sodium hydroxide are added and the whole is heated at a temperature of 85° for 4 hours. A thick white pap is obtained which is distributed between water and ether. The ether-phase is washed with water until neutral and dried over magnesium sulphate. After subsequent evaporation of the ether one obtains a semi solid residue which is purified chromatographically by means of a column of neutral silica gel with benzene as eluent. The benzene fractions containing the desired ester, are combined and the solvent is distilled off. One obtains 0.20 g., 3.5% of the theoretical amount, of pure 2-(fluoren-2-yloxy)-propionic acid ethyl ester, M.P. 55–58° ($n_D^{20}$: 1.5869).

EXAMPLE 3

In a round-bottom flask, provided with reflux condenser, drying tube containing potassium hydroxide, thermometer and gas inlet tube, 5.0 g. (0.0275 mol) of fluoren-2-ol are added to a suspension of 1.5 g. of 50% sodium hydride dispersion in 100 ml. of absolute dimethylformamide. The fluoren-2-ol is brought into solution by stirring and heating to 35° and 8.2 g. (0.0346 mol) of bromocyclohexyl-acetic acid ethyl ester are added to the obtained solution of the sodium-fluoren-2-olate. After stirring for 7 hours at 100°, the dimethylformamide is concentrated by evaporation at 50° in vacuo. The residue is distributed between water and ether, the ether phase repeatedly washed with 1 N sodium hydroxide solution and concentrated by evaporation, whereby the crude α-(fluoren-2-yloxy)-cyclohexane-acetic acid ethyl ester remains behind.

EXAMPLE 4

In a round-bottom flask, provided with reflux condenser, dropping funnel, drying tube containing potassium hydroxide, stirrer and gas inlet tube, 3.65 g. (0.02 mole) of fluoren-2-ol are added to a solution of 0.46 g. (0.02 mole) of sodium in 25 ml. of absolute ethanol in a nitrogen atmosphere. To the thus obtained solution of the sodium-fluoren-2-olate is added dropwise, while stirring, an ethanolic solution—prepared in the same manner—of the sodium salt of the 2-bromoheptanoic acid [from 4.2 g. (0.02 mol) of 2-bromoheptanoic acid, 0.46 g. (0.02 mol) of sodium, 80 ml. of absolute ethanol] and the whole is refluxed for 7 hours. A crystal sludge is thereby obtained which, after the reaction has finished, is separated in vacuo from the solvent and taken up in water. The solid product, precipitating after acidification of the aqueous solution with concentrated hydrochloric acid, is taken up in ether. The ethereal solution is extracted with dilute sodium hydroxide solution and the alkaline solution again acidified. After extracting again with ether, the ethereal solution is dried, after washing with water, over sodium sulphate and the solvent is evaporated off in vacuo. The obtained crude 2-(fluoren-2-yloxy)-heptanoic acid, which is still mainly contaminated with fluoren-2-ol, is purified chromatographically through a column [silica gel 0.05–0.2 mm. Merck, solvent benzene/glacial acetic acid (85.15)]. After concentrating the pure fractions by evaporation, the obtained solid residue is recrystallised twice from ca. 50% methanol with the addition of active charcoal. 3.2 g. (52% of the theoretical value) of 2-(fluoren-2-yloxy)-paltanoic acid, M.P. 133–136°, are obtained in the form of fine needles.

EXAMPLE 5

In a round-bottom flask, provided with reflux condenser, dropping funnel, drying tube containing potassium hydroxide, stirrer and gas inlet tube, 5.98 g. (0.03 mol) of fluoren-2-thiol are added under nitrogen to a solution of 0.7 g. (0.03 mol) of sodium in 100 ml. of absolute ethanol. To the thus obtained suspension of the sodium-fluoren-2-thiolate are added dropwise 7.55 g. (0.032 mol) of 2-bromoheptanoic acid ethyl ester and the whole is refluxed for 3 hours. The reaction mixture is concentrated by evaporation in vacuo, the residue distributed between water and ether and the ether phase extracted by shaking three times with 1 N sodium hydroxide solution. After washing with water to obtain pH=7 and drying with magnesium sulphate, the ether solution is concentrated by evaporation, whereby 10.2 g. of a dark-yellow oil are obtained. The crude 2-(fluoren-2-ylthio)-heptanoic acid ethyl ester, which is still contaminated with fluoren-2-thiol, is purified by column chromatography (silica gel 0.05–0.2 mm. Merck, solvent benzene). The benzene fractions containing the desired ester are combined and concentrated by evaporation. After drying in high vacuum, 9.5 g. (88.9% of theoretical value) of pure 2-(fluoren-2-ylthio)-heptanoic acid ethyl ester, $n_D^{22°}$: 1.5898, are obtained.

The following are obtained analogously:

from 5.98 g. (0.03 mol) of fluoren-2-thiol and 5.8 g. (0.032 mol) of 2-bromopropionic acid ethyl ester, 8.35 g. (92.4% of theoretical value) of 2-(fluoren-2-lythio)-propionic acid ethyl ester, $n_D^{20°}$: 1.6195;

from 5.98 g. (0.03 mol) of fluoren-2-thiol and 7.6 g. (0.032 mol) of 2-bromoisoheptanoic acid ethyl ester, 9.7 g. (90.5% of theoretical value) of 2-(fluoren-2-ylthio)-isoheptanoic acid ethyl ester, $n_D^{20°}$: 1.5891;

from 2.0 g. (0.01 mol) of fluoren-2-thiol and 3.38 g. (0.011 mol) of 2-bromododecanoic acid ethyl ester, 3.5 g. (81.7% of theoretical value) of 2-(fluoren-2-ylthio)-dodecanoic acid ethyl ester, M.P. 55–57° (from ethanol).

EXAMPLE 6

10.0 g. of 2-(fluoren-2-yloxy)-heptanoic acid ethyl ester are added to a solution of 4 g. of potassium hydroxide in 150 ml. of methanol and the whole is refluxed for half an hour. The reaction mixture is concentrated by evaporation, the residue is distributed between water and ether, the aqueous phase is acidified with concentrated hydrochloric acid and extracted with ether. The combined ether solutions are washed with water and dried with magnesium sulphate, whereby 8.6 g. of crude 2-(fluoren-2-yloxy)-heptanoic acid are obtained. After recrystallisation from methanol/water, 8.0 g. (78.5% of theoretical value) of pure acid, M.P. 133–136°, are obtained.

The following are obtained analogously:

from the crude 2-(fluoren-2-yloxy)-butyric acid ethyl ester made from 4.0 g. of fluoren-2-ol and 2-bromobutyric acid ethyl ester, 5.2 g. (88.2% of theoretical value, relative to fluoren-2-ol) of 2-(fluoren-2-yloxy)-butyric acid, M.P. 154–156° (from ethylacetate/petroleum ether);

from the crude 2-(fluoren-2-yloxy)-decanoic acid ethyl ester made from 4.0 g. of fluoren-2-ol and 2-bromodecanoic acid ethyl ester, 5.0 g. (64.5% of theoretical value, relative to fluoren-2-ol) of 2-(fluoren-2-yloxy)-decanoic acid, M.P. 124–126° (from ethyl acetate/hexane);

from the crude 2-(fluoren-2-yloxy)-dodecanoic acid ethyl ester made from 4.4 g. of fluoren-2-ol and 2-bromododecanoic acid ethyl ester, 6.8 g. (74% of theoretical value, relative to fluoren-2-ol) of 2-(fluoren-2-yloxy)-dodecanoic acid, M.P. 120–122° (from methanol/water);

from 6.3 g. (0.0225 mol) of 2-(fluoren-2-yloxy)-propionic acid ethyl ester, 5.1 g. (90% of theoretical value) of 2-(fluoren-2-yloxy)-propionic acid, M.P. 175–178° (from methanol);

from 9.3 g. (0.0315 mol) of 2-(fluoren-2-yloxy)-2-methylpropionic acid ethyl ester, 7.8 g. (93% of theoretical value) of 2-(fluoren-2-yloxy)-2-methylpropionic acid, M.P. 150–151° (from methanol);

from 5.5 g. (0.0177 mol) of 2-(fluoren-2-yloxy)-valerianic acid ethyl ester, 4.15 g. (82.9% of theoretical value) of 2-(fluoren-2-yloxy)-valerianic acid, M.P. 158–159° (from benzene/benzine);

from 5.9 g. (0.0184 mol) of 2-(fluoren-2-yloxy)-hexanoic acid ethyl ester, 5.2 g. (96% of theoretical value) of 2-(fluoren-2-yloxy)-hexanoic acid, M.P. 153–154° (from methanol/water);

from 9.4 g. (0.0267 mol) of 2-(fluoren-2-yloxy)-5,5-dimethyl-hexanoic acid ethyl ester, 8.1 g. (94% of theoretical value) of 2-(fluoren-2-yloxy)-5,5-dimethyl-hexanoic acid, M.P. 142–143° (from methanol/water);

from 5.2 g. (0.0154 mol) of 2-(fluoren-2-yloxy)-isoheptanoic acid ethyl ester, 4.5 g. (94% of theoretical value) of 2-(fluoren-2-yloxy)-isoheptanoic acid, M.P. 144–145° (from methanol/water);

from 8.3 g. (0.0236 mol) of 2-(fluoren-2-yloxy)-octanoic acid ethyl ester, 7.5 g. (98% of theoretical value) of 2-(fluoren-2-yloxy)-octanoic acid, M.P. 134–135° (from methanol/water);

from 3.1 g. (0.0093 mol) of α-(fluoren-2-yloxy)-cyclopentaneacetic acid ethyl ester, 2,3 g. (81% of theoretical value) of α-(fluoren-2-yloxy)-cyclopentaneacetic acid, M.P. 172–174° (from methanol/water);

from 6.9 g. (0.020 mol) of α-(fluoren-2-yloxy)-hydrocinnamic acid ethyl ester, 6.1 g. (95.9% of theoretical value) of α-(fluoren-2-yloxy)-hydrocinnamic acid, M.P. 152–154° (from methanol/water);

from 9.6 g. (fluoren-2-yloxy)-cyclohexane acetic acid ethyl ester, 4.6 g. (52% of the theoretical value) of (fluoren-2-yloxy)-cyclohexane acetic acid, M.P. 164–167° (from benzene/cyclohexane).

EXAMPLE 7

In a round flask with reflux condenser, 8.9 g. (0.025 mol) of 2-(fluoren-2-ylthio)-heptanoic acid ethyl ester are refluxed in a solution of 4.3 g. of potassium hydroxide in 200 ml. of methanol and 30 ml. of water for one hour. The reaction mixture is concentrated by evaporation, the residue distributed between water and ether, the aqueous phase acidified with concentrated hydrochloric acid and extracted with ether. The combined ether solutions are washed with water and dried with magnesium sulphate, whereby 8.15 g. of crude 2-(fluoren-2-ylthio)-heptanoic acid remain behind. After recrystallising twice from benzine, 7.5 g. (91.5% of theoretical value) of pure 2-(fluoren-2-ylthio)-heptanoic acid, M.P. 84–86°, are obtained.

The following are obtained analogously:

from 6.4 g. (0.023 mol) of 2-(fluoren-2-ylthio)-propionic acid ethyl ester, 4.8 g. (82.8% of theoretical value) of 2-(fluoren-2-ylthio)-propionic acid, M.P. 139–140° (from methanol/water);

from 8.9 g. (0.025 mol) of 2-(fluoren-2-ylthio)-isoheptanoic acid ethyl ester, 6.3 g. (76.8% of theoretical value) of 2-(fluoren-2-ylthio)-isoheptanoic acid, M.P. 58–60° [solidified after column chromatography: silica gel 0.05–0.2 mm. Merck, solvent benzene/glacial acetic acid (85:15)];

from 3.5 g. (0.0082 mol) of 2-(fluoren-2-ylthio)-dodecanoic acid ethyl ester, 2.5 g. (76.5% of theoretical value) of 2-(fluoren-2-ylthio)-dodecanoic acid, M.P. 81–83° (from methanol/water).

EXAMPLE 8

2.0 g. of 2-(fluoren-2-yloxy)-heptanoic acid nitrile are refluxed for 42 hours in a solution of 2 g. of potassium hydroxide in 70 ml. of ethanol and 15 ml. of water. The reaction solution is then acidified with 2 N hydrochloric acid, the ethanol evaporated off in vacuo, the aqueous phase remaining is extracted with ether and the ether solution washed twice with water. After drying with magnesium sulphate, the ether phase is concentrated by evaporation. The crude 2-(fluoren-2-yloxy)-heptanoic acid, which remains, is recrystallised from methanol/water, M.P. 133–136°.

The following are obtained analogously:

from 2.0 g. of 2-(fluoren-2-yloxy)-butyronitrile is obtained 2-(fluoren-2-yloxy)-butyric acid, M.P. 154–156° (from ethylacetate/petroleum ether);

from 2.0 g. of 2-(fluoren-2-yloxy)-decanoic acid nitrile is obtained 2-(fluoren-2-yloxy)-decanoic acid, M.P. 124-126° (from ethylacetate/hexane);

from 2.0 g. of 2-(fluoren-2-yloxy)-dodecanoic acid nitrile is obtained 2-(fluoren-2-yloxy)-dodecanoic acid, M.P. 120–122° (from methanol/water).

The 2-(fluoren-2-yloxy)-alkanoic acid nitriles used as starting materials can be obtained in the following manner:

(a) In a round-bottom flask, provided with stirrer, reflux condenser, dropping funnel and drying tube containing potassium hydroxide, 57.0 g. (0.5 mol) of cyanoacetic acid ethyl ester are dissolved in 200 ml. of absolute ethanol. 11.5 g. (0.5 mol) of metallic sodium are added to the solution, the addition being made in small portions to prevent the temperature thereby exceeding 60°. After ca. 2 hours, when the added metallic sodium has completely dissolved, 75.5 g. (0.5 mol) of n-pentyl bromide are added dropwise at a temperature of 40–50° and the obtained mixture is subsequently refluxed for 2 hours.

After cooling to room temperature, the reaction mixture is poured on to a mixture of ice and water and the precipitating oil taken up in ether. The ether solution is washed with water until a neutral reaction is obtained, dried over sodium sulphate, filtered and then concentrated by evaporation in a rotary evaporator. The residue is distilled in vacuo with an oil-bath temperature of 140–150°. The n-pentyl-cyanoacetic acid ethyl ester boils at 117–119°/12 torr.

The following compounds are obtained in an analogous manner:

from 54.5 g. of ethyl bromide, the ethyl-cyanoacetic acid ethyl ester, B.P. 82–84°/12 torr;
from 96.5 g. of n-octyl bromide, the octyl-cyanoacetic acid ethyl ester, B.P. 158–160°/12 torr;
from 110.6 g. of n-decyl bromide, the decyl-cyanoacetic acid ethyl ester, B.P. 178–180°/12 torr.

(b) In a flask, provided with stirrer, reflux condenser and dropping funnel, 32 g. (0.2 mol) of bromine are added dropwise, while stirring, to a mixture of 36.6 g. (0.2 mol) of n-pentyl-cyanoacetic acid ethyl ester, 160 ml. of water, 20.5 g. (0.25 mol) of sodium acetate and a spatula tip of monoperphthalic acid. The reaction mixture is then heated for 2½ hours to 60° and, after cooling, taken up with ether. The obtained ether solution is then washed successively with a dilute sodium bisulphite solution, dilute sodium bicarbonate solution and water until a neutral reaction is obtained, dried over sodium sulphate, filtered and subsequently concentrated by evaporation in a rotary evaporator. The residue is distilled in vacuo. The obtained bromo-n-pentyl-cyanoacetic acid-ethyl ester boils at 122–124°/10 torr.

The following are obtained in an analogous manner:

from 28.2 g. of ethyl-cyanoacetic acid ethyl ester, the bromoethyl-cyanoacetic acid ethyl ester, B.P. 84–87°/10 torr;
from 45.0 g. of octyl-cyanoacetic acid ethyl ester, the bromooctyl-cyanoacetic acid ethyl ester (further processed as crude product);
from 50.6 g. of decyl-cyanoactic acid ethyl ester, the bromodecyl-cyanoacetic acid ethyl ester (further processed as crude product).

(c) In a round-bottom flask, provided with stirrer, dropping funnel and drying tube containing potassium hydroxide, 18.2 g. (0.1 mol) of fluoren-2-ol are dissolved in 350 ml. of dimethylformamide at room temperature. To this solution are added, while stirring, 4.8 g. (0.1 mol) of sodium hydride dispersion (50% dispersion in mineral oil). After the complete reaction to the sodium salt, 26.2 g. (0.1 mol) of bromo-n-pentyl-cyanoacetic acid ethyl ester are added dropwise at room temperature and the mixture subsequently heated on the water-bath for one hour, while stirring, to a temperature of 60°. After cooling, the obtained reaction mixture is poured on to a mixture of ice and water, the precipitating oil extracted by ether and washed with 1 N sodium hydroxide solution and water until a neutral reaction is obtained. The obtained ether solution is dried over sodium sulphate, filtered and then concentrated by evaporation in vacuo. The residue is purified chromatographically through a column (silica gel 0.05–0.2 mm. Merck, benzene as solvent). The (fluoren-2-yloxy)-pentylcyanoacetic acid ethyl ester, obtained after evaporation of the benzene and drying of the residue remaining, can be further processed directly.

The following are obtained in an analogous manner:

from 22.0 g. of bromoethyl-cyanoacetic acid ethyl ester, the (fluoren-2-yloxy)-ethyl-cyanoacetic acid ethyl ester;
from 30.4 g. of bromooctyl-cyanoacetic acid ethyl ester, the (fluoren-2-yloxy)-octyl-cyanoacetic acid ethyl ester;
from 33.2 g. of bromodecyl-cyanoacetic acid ethyl ester, the (fluoren-2-yloxy)-decyl-cyanoacetic acid ethyl ester.

(d) In a round flask provided with a magnetic stirrer, 18.2 g. (0.05 mol) of (fluoren-2-yloxy)-pentyl-cyanoacetic acid ethyl ester and 55 ml. of 1 N sodium hydroxide solution are heated for 2 hours, while stirring, to 80–90° (ethanolic 1 N sodium hydroxide solution can also be used, instead of aqueous 1 N sodium hydroxide solution). After cooling, the reaction mixture, diluted with water, is extracted with ether, the obtained aqueous phase acidified with hydrochloric acid and the now precipitated oil taken up in ether and subsequently washed with water. The obtained (fluoren-2-yloxy)-pentyl-cyanoacetic acid is further processed as crude product.

Analogously are obtained:

from (fluoren-2-yloxy)-ethyl-cyanoacetic acid ethyl ester the (fluoren-2-yloxy)-ethyl-cyanoacetic acid;
from (fluoren-2-yloxy)-octyl-cyanoacetic acid ethyl ester the (fluoren-2-yloxy).

(e) In a round-bottom flask, 2.5 g. (0.0075 mol) of crude (fluoren-2-yloxy)-pentyl-cyanoacetic acid are heated with a spatula tip of copper powder for half an hour to 150°. A viscous, dark-brown oil is obtained. This is taken up in ether and the ethereal solution washed with 0.1 N sodium hydroxide solution. After washing with water, the etheral solution is dried over sodium sulphate and concentrated by evaporation. The brown crystalline residue is purified by column chromatography (silica gel 0.05–0.2 mm. Merck, solvent benzene). The yellow, solid main fraction (1.4 g.) is recrystallised twice from ethanol with the addition of active charcoal. 1.05 g. (48% of theoretical value) of pure 2-(fluoren-2-yloxy)-heptanoic acid nitrile are obtained in the form of yellowish needles, M.P. 81–82°.

The following are obtained analogously:

from (fluoren-2-yloxy)-ethyl-cyanoacetic acid the 2-(fluoren-2-yloxy)-decanoic acid nitrile;
from (fluoren-2-yloxy)-octyl-cyanoacetic acid the 2-(fluoren-2-yloxy)-decanoic acid nitrile;
from (fluoren-2-yloxy)-decyl-cyanoacetic acid the 2-(fluoren-2-yloxy)-dodecanoic acid nitrile.

The 2-(fluoren-2-yloxy)-alkanoic acid nitriles used as starting materials can also be obtained in the following way:

In a round flask, provided with reflux condenser, drying tube containing potassium hydroxide, dropping funnel, thermometer and gas inlet tube, 4.2 g. (0.026 mol) of fluoren-2-ol are added to a suspension of 1.25 g. of 50% sodium hydride dispersion in 100 ml. of absolute dimethylformamide in a nitrogen atmosphere. The fluorenol is taken into solution by stirring and heating to 35° and 5.7 g. (0.029 mol) of 2-bromoheptanoic acid nitrile are added dropwise to the obtained solution of the sodium-fluoren-2-olate. After heating for 1½ hours to 60°, the reaction mixture is allowed to stand at room temperature for ca. 15 hours and the solvent is then evaporated off at 50° in vacuo. The oily residue is distributed between water and ether, the ether phase repeatedly washed with 1 N sodium hydroxide solution and concentrated by evaporation, whereby the crude 2-(fluoren-2-yloxy)-heptanoic acid nitrile remains behind, which is purified by column chromatography (silica gel 0.05–0.2 mm. Merck, solvent benzene). After concentrating the pure fractions by evaporation, the latter are recrystallised twice from ethanol with the addition of active charcoal. In this manner are obtained 4.9 g. (61.3% of theoretical value) of pure 2-(fluoren-2-yloxy)-heptanoic acid nitrile in the form of yellowish needles, M.P. 81–82°.

EXAMPLE 9

In a round-bottom flask provided with a reflux condenser 1.5 g. (0.0048 mol) 2-(fluoren-2-yloxy)-heptanoic acid amide are added to a solution of 0.56 g. potassium hydroxide in 50 ml. methanol and 5 ml. water and the whole is refluxed for 20 hours. After cooling to room temperature the reaction mixture is evaporated to dryness. The residue is suspended in water, acidified with 1 N hydrochloric acid and extracted with ether. The extract is washed with water, dryed over magnesium sulphate and evaporated in vacuo. After the recrystallisation of the residue from methanol/water 1.43 g. 95.0% of the theoretical amount, pure 2-(fluoren-2-yloxy)-heptanoic acid, M.P. 133–136°, are obtained.

The 2-(fluoren-2-yloxy)-heptanoic acid amide used as starting materials e.g. can be obtained according to the following procedure:

In a round-bottom flask, provided with reflux condenser, drying tube containing potassium hydroxide, and gas inlet tube, 6.0 g. (0.033 mol) of fluoren-2-ol are added under nitrogen to a solution of 0.76 g. (0.033 mol) of sodium in 70 ml. of absolute ethanol. To the thus obtained solution of the sodium-fluoren-2-olate are added dropwise a solution of 5.7 g. (0.0346 mol) of 2-chloroheptanoic acid amide (Vandewijzer, Bl. Soc. Chim. Belg. 45 [1936], 252,255) in 50 ml. abs. ethanol and the whole is refluxed for 4½ hours. The reaction mixture is concentrated by evaporation in vacuo, the residue distributed between water and chloroform. The chloroform phase is extracted by shaking three times with 0.5 N sodium hydroxide solution. After washing with water until the pH-value is 7 and drying with magnesium sulphate, the ether solution is concentrated by evaporation.

The residue is recrystallized from ethanol. One obtains 8.2 g. 80.3% of the theoretical amount of pure 2-(fluoren-2-yloxy)-heptanoic acid amide, M.P. 173–175°.

EXAMPLE 10

(a) 16.0 g. (0.04 mol) of crude (fluoren-2-yloxy)-pentyl-malonic acid diethyl ester are refluxed in a solution of 5.4 g. of potassium hydroxide (85%) in 30 ml. of methanol for 18 hours. After evaporating off the methanol in vacuo, the residue is dissolved in about 500 ml. of ice water and the obtained solution acidified with 10 ml. of concentrated hydrochloric acid. The precipitated colourless crystals are washed with water and dissolved in 200 ml. of methanol. After filtering, the 2-(fluoren-2-yloxy)-heptanoic acid, M.P. 133–136°, is precipitated by the dropwise addition of water.

(b) 8.0 g. of (fluoren-2-yloxy)-pentyl-malonic acid diethyl ester are refluxed for 24 hours in a mixture of 20 ml. of 5 N sulphuric acid and 100 ml. of glacial acetic acid. The reaction mixture is poured, after cooling, on to 800 ml. of ice water, whereby the 2-(fluoren-2-yloxy)-heptanoic acid precipitates out in the form of crystals. After recrystallisation from methanol/water, the acid melts at 133–136°.

Analogously to (a) and (b) the following are obtained:

from (fluoren-2-yloxy)-methyl malonic acid diethyl ester the 2-(fluoren-2-yloxy)-propionic acid, M.P. 175–178° (from methanol);
from (fluoren-2-yloxy)-decyl malonic acid diethyl ester the 2-(fluoren-2-yloxy)-dodecanoic acid, M.P. 120–122° (from methanol/water).

The alkyl malonic acid diethyl esters used as starting materials can be obtained in the following manner:

In a round-bottom flask, provided with reflux condenser, dropping funnel, drying tube containing potassium hydroxide, stirrer and gas inlet tube, 11.0 g. (0.06 mol) of fluoren-2-ol are added under nitrogen to a solution of 1.5 g. (0.065 mol) of sodium in 100 ml. of absolute ethanol. To the thus obtained solution of the sodium-fluoren-2-oleate are added dropwise 21.0 g. (0.067 mol) of bromo-pentyl-malonic acid diethyl ester and the whole is refluxed for 6 hours. The reaction mixture is concentrated by evaporation in vacuo, the residue distributed between water and ether and the ether phase extracted by shaking three times with 0.5 N sodium hydroxide solution. After washing with water to pH=7 and drying with magnesium sulphate, the ether solution is concentrated by evaporation, whereby 18.0 g. of a brown oil are obtained. This crude (fluoren-2-yloxy)-pentyl-malonic acid diethyl ester, which is still contaminated with fluoren-2-ol, is purified by column chromatography (silica gel 0.05–0.2 mm. Merck, solvent benzene). The benzene fractions, containing the desired ester, are combined and concentrated by evaporation. 16.5 g. (67% of theoretical value) of pure (fluoren-2-yloxy)-pentyl-malonic acid diethyl ester are obtained as a yellowish oil; $n_D^{20°}$: 1.5500.

The following are obtained analogously:

from 3.65 g. (0.02 mol) fluoren-2-ol and 5.2 g. (0.02 mol) bromo methyl malonic acid diethyl ester 4.5 g., 63.5% of the theoretical amount of (fluoren-2-yloxy)-methyl malonic acid diethyl ester, M.P. 69–70° (from petrol/ether);
from 3.65 g. (0.02 mol) fluoren-2-ol and 7.8 g. (0.02 mol) bromo decyl malonic acid diethyl ester 5.5 g., 57.3% of the theoretical amount of (fluoren-2-yloxy)-decyl malonic acid diethyl ester, $n_D^{20}$:1.5346.

EXAMPLE 11

(a) 2.0 g. of (fluoren-2-yloxy) pentyl-cyanoacetic acid ethyl ester [cp. Example 8(a)–(c)] are refluxed for 21 hours in a solution of 1.0 g. of potassium hydroxide in 25 ml. of ethanol and 2.5 ml. of water. After evaporating off the ethanol in vacuo, the mixture is acidified with 2 N hydrochloric acid, extracted with ether, the ether phase washed with water and dried over magnesium sulphate. After concentrating by evaporation, a mixture of 2-(fluoren-2-yloxy)-2-carboxy-heptanoic acid amide, 2-(fluoren-2-yloxy)-heptanoic acid and 2-(fluoren-2-yloxy)-heptanoic acid amide is obtained.

(b) To decarboxylate, the mixture obtained according to (a) is heated for 20 minutes in xylene to boiling. After concentrating by evaporation, a mixture of 2-(fluoren-2-yloxy)-heptanoic acid amide and 2-(fluoren-2-yloxy)-heptanoic acid is obtained.

(c) The mixture obtained according to (b) is refluxed to boiling in a solution of 1 g. of potassium hydroxide in 50 ml. of ethanol and 5 ml. of water for 40 hours and then processed, as described in the case of the hydrolysis of the nitrile [Example 8]. After recrystallising from methanol/water, the obtained 2-(fluoren-2-yloxy)-heptanoic acid melts at 133–136°.

(d) 0.6 g. of the mixture, obtained according to Example 11(a) and consisting of 2-(fluoren-2-yloxy)-2-carboxy-heptanoic acid amide, 2-(fluoren-2-yloxy)-heptanoic acid amide and 2-(fluoren-2-yloxy)-heptanoic acid, are refluxed to a temperature of 90° for 6 hours in a mixture of 34 ml. of 70% sulphuric acid (v./v.) and 17 ml. of glacial acetic acid. After evaporating off the acetic acid in vacuo and diluting the residue with water, the solution is extracted with ether, the ether solution dried and concentrated by evaporation, whereby the 2-(fluoren-2-yloxy)-heptanoic acid remains behind. After recrystallisation from ethylacetate/petroleum ether and then from methanol/water, the acid melts at 133–136°.

Analogously to (a)–(d) the following are obtained:

from (fluoren-2-yloxy)-methyl-cyanoacetic acid ethyl ester the 2-(fluoren-2-yloxy)-propionic acid, M.P. 175–178° (from methanol);
from (fluoren-2-yloxy)-decyl-cyanoacetic acid ethyl ester the 2-(fluoren-2-yloxy)-dodecanoic acid, M.P. 120–122° (from methanol/water).

EXAMPLE 12

0.9 g. (0.0021 mol) (fluoren-2-ylthio)-pentyl-malonic acid diethyl ester are added to a solution of 0.8 g. potassium hydroxide in 30 ml. ethanol and 5 ml. water and the whole is refluxed for 4 hours. Then the solvent is distilled off and the residue is dissolved in water. After washing with ether, the aqueous solution is acidified with 2 N hydrochloric acid and extracted with ether. The extract is dried over magnesium sulphate and the ether distilled off in vacuo. The thus obtained residue consisting essentially of (fluoren-2-ylthio)-pentyl-malonic acid is heated at 140° for 20 minutes while stirring. The crude 2-(fluoren-2-ylthio)-heptanoic acid thus obtained is purified by column chromatography (silica gel Merck, grain size 0.05–0.2 mm., solvent benzene/acetic acid 85:15). The fractions containing the desired acid are combined and the solvent is evaporated in vacuo. The residue is recrystallised twice from gasoline. One obtains 0.6 g., 87% of the theoretical amount, pure 2 - (fluoren-2-ylthio)-heptanoic acid, M.P. 84–86°.

The following are obtained analogously:

from (fluoren-2-ylthio)-methyl-malonic acid diethyl ester the 2-(fluoren-2-ylthio)-propionic acid, M.P. 139–140° (from methanol/water);
from (fluoren - 2-ylthio)-isopentyl-malonic acid diethyl ester the 2-(fluoren-2-ylthio)-isoheptanoic acid, M.P. 58–60° (purified chromatographically by means of a column containing silica gel, Merck, grain size 0.05–0.2 mm., (solvent benzene-glacial acetic acid 85:15));
from (fluoren-2-ylthio)-decyl-malonic acid diethyl ester the 2-(fluoren-2-ylthio)-dodecanoic acid, M.P. 81–83° (from methanol/water)

The substituted malonic acid diethyl ester used as starting material can be obtained in the following manner:

In a round-bottom flask, provided with a reflux condenser, a dropping funnel, a drying tube containing potassium hydroxide, a stirrer and a gas inlet tube 1.98 (0.01 mol) fluoren-2-thiol are added to a solution of 0.23 g. (0.01 mol) sodium in 30 ml. abs. ethanol under nitrogen.

To the suspension of sodium-fluoren-2-thiolate thus obtained one adds dropwise 3.09 g. (0.01 mol) bromo-pentylmalonic acid diethyl ester and the whole is refluxed for 2 hours. Then the solvent is evaporated in vacuo, the residue is distributed between water and ether and, after washing with water and drying over magnesium sulphate the ether is evaporated. The residue, 2.9 g. of a dark red oil is purified by column chromatography using silica gel, Merck, grain size 0.05–0.2 mm. and benzene. The fractions containing the desired ester are combined and the benzene is evaporated in vacuo. The residue is dried in vacuo. One obtains 0.9 g., 21.1% of the theoretical amount, pure (fluoren-2-ylthio)-pentyl-malonic acid diethyl ester as a reddish oil, $n_D^{20}$:1.5702.

The following are obtained analogously:

from 1.98 g. (0.01 mol) fluoren-2-thiol and 2.53 g. (0.01 mol) bromo-methyl-malonic acid diethyl ester 0.1 g. 2.7% of the theoretical amount, of (fluoren-2-ylthio)-methyl-malonic acid diethyl ester, M.P. 62–64°. Further, 0.8 g., 29.6% of the theoretical amount, 2-(fluoren-2-ylthio)-propionic acid are obtained;
from 1.98 (0.01 mol) fluoren-2-thiol and 3.09 g. (0.01 mol) bromo-isopropyl-malonic acid diethyl ester 1.26 g., 29.5% of the theoretical amount of (fluoren-2-ylthio)-isopentyl-malonic acid diethyl ester, $n_D^{20}$: 1.5692;
from 1.98 g. (0.01 mol) fluoren-2-thiol and 3.79 g. (0.01 mol) bromo-decyl-malonic acid diethyl ester 0.55 g., 11.1% of the theoretical amount of (fluoren-2-ylthio)-decyl-malonic acid diethyl ester, $n_D^{20}$:1.5520.

EXAMPLE 13

1.1 g. (0.0029 mol) (fluoren-2-ylthio)-pentyl-cyano-acetic acid ethyl ester are added to a solution of 1.7 g. potassium hydroxide in 6 ml. water and the whole is refluxed for 20 hours. Then the solvent is evaporated in vacuo, the residue is taken up with warm water and filtered. The filtrate is acidified with 2 N hydrochloric acid and extracted with ether. The extract is dried over magnesium sulphate and the ether is distilled off in vacuo. The remaining yellow oil is purified chromatographically by means of a column containing silica gel, Merck, grain size 0.05–0.2 mm., using benzene/glacial acetic acid as eluent. The fractions containing the derived acid are combined and the solvent was evaporated. The residue is taken up with ether and washed with water until neutral. After drying the ether solution with magnesium sulphate the ether is distilled off in vacuo. The residue is recrystallised from petrol ether, 0.8 g., 84.7%. Of the theoretical amount, pure 2-(fluoren-2-ylthio)-heptanoic acid, M.P. 84–86°, are obtained.

The following are obtained in analogous manner:

from (fluoren-2-ylthio)-methyl-cyanoacetic acid ethyl ester the 2-(fluoren-2-ylthio)-propionic acid, M.P. 139–140° from (methanol/water);
from (fluoren-2-ylthio)-decyl-cyanoacetic acid ethylester the 2-(fluoren-2-ylthio)-dodecanoic acid, M.P. 81–83° (from methanol/water).

The substituted cyanoacetic esters used as starting materials can be obtained in the following manner:

In a round-bottom flask provided with a reflux condenser, a dropping funnel, a drying tube containing potassium hydroxide and a gas inlet tube, 3.96 g. (0.02 mol) of fluoren-2-thiol are added to a solution of 0.46 g. (0.02 mol) of sodium in 60 ml. abs. ethanol under nitrogen. To the suspension of sodium fluoren-2-thiolate thus obtained 5.24 g. (0.02 mol) bromo-pentyl-cyanoacetic acid ethyl ester are added dropwise and the whole is refluxed for 4 hours. Then the reaction mixture is evaporated to dryness and the obtained residue is distributed between water and ether. The ether phase is separated, dried over sodium sulphate and subsequently the ether is distilled off. An oily residue is obtained which is purified by column chromatography using silica gel, Merck, grain size 0.05–0.2 mm. and benzene. The fractions containing the desired ester are combined and the benzene is distilled off. 1.54 g., 20.3% of the theoretical amount, pure (fluoren-2-ylthio)-pentyl-cyanoacetic acid ethyl ester are obtained as a yellow oil, $n_D^{20}$:1.5893.

The following are obtained analogously:

from 3.96 g. (0.02 mol) fluoren-2-thiol and 4.12 g. (0.02 mol) crude bromo-methyl-cyano acetic acid ethyl ester 0.5 g., 9.7% of the theoretical amount of (fluoren-2-ylthio)-methyl-cyano acetic acid ethyl ester, $n_D^{20}$: 1.5992;
from 1.98 g. (0.01 mol) fluoren-2-thiol and 3.32 g. (0.01 mol) bromo-decyl-cyano acetic ethyl ester 1.3 g., 28.9% of the theoretical amount of (fluoren-2-ylthio)-decyl-cyano acetic acid ethyl ester, $n_D^{20}$:1.5620.

EXAMPLE 14

In a round-bottom flask, 1.0 g. (0.0028 mol) of (fluoren-2-yloxy)-pentyl-malonic acid is heated for 2 hours at 140°. After cooling, it is taken up in dilute sodium hydroxide solution, washed with ether and the aqueous phase then acidified with 2 N hydrochloric acid, whereby the crude 2-(fluoren-2-yloxy-heptanoic acid precipitates in solid form. It is filtered with suction and chromatographically purified through a column [silica gel 0.05–0.2 mm. Merck, solvent benzene/glacial acetic acid 85:15)]. The pure fractions are combined and concentrated by evaporation in vacuo. By recrystallisation from methanol/water 0.5 g. (57–1% of theoretical value) of pure 2-(fluoren-2-yloxy)-heptanoic acid, M.P. 133–136°, are obtained.

The following are obtained analogously:

from (fluoren-2-yloxy)-methyl-malonic acid the 2-(fluoren-2-yloxy)-propionic acid, M.P. 175–178° (from methanol);
from (fluoren-2-yloxy)-decyl-malonic acid the 2-(fluoren-2-yloxy)-dodecanoic acid, M.P. 120–122° (from methanol/water).

The (fluoren-2-yloxy)-alkyl-malonic acids used as starting materials can be obtained in the following manner:

4.1 g. (0.01 mol) of (fluoren-2-yloxy)-pentyl-malonic acid diethyl ester are refluxed in a solution of 2.0 g. of potassium hydroxide (86%) in methanol/water 3:1 (80 ml.) for 5 hours. After evaporating off the solvent in vacuo, the residue is taken up in water and washed with ether. The aqueous phase is acidified with 2 N hydrochloric acid and the precipitating oil extracted with ether. After drying over sodium sulphate, the ethereal phase is concentrated by evaporation in vacuo. The oily residue remaining, consisting of (fluoren - 2 - yloxy)-n-pentyl-malonic acid and 2-(fluoren-2-yloxy)-heptanoic acid, is chromatographically purified through a column [silica gel 0.05–0.2 mm. Merck, solvent benzene/glacial acetic acid (85:15)]. The fractions containing (fluoren-2-yloxy)-pentyl-malonic acid are carefully concentrated by evaporation, diluted with ether and washed with water. After drying over sodium sulphate, the ethereal solution is carefully concentrated by evaporation. In this manner are obtained 1.4 g. (39.5% of theoretical value) of (fluoren-2-yloxy)-n-pentyl-malonic acid as yellowish oil, which crystallises on standing. The thus obtained (fluoren-2-yloxy)-pentyl-malonic acid, which already slowly decarboxylates at room temperature, contains only a very small amount of 2-(fluoren-2-yloxy)-heptanoic acid.

The following are obtained analogously:

from (fluoren-2-yloxy)-methyl-malonic acid diethyl ester the (fluoren-2-yloxy)-methyl-malonic acid;
from (fluoren-2-yloxy)-decyl-malonic acid diethyl ester the (fluoren-2-yloxy)-decyl-malonic acid.

EXAMPLE 15

In a round-bottom flask 1.5 g. (0.00406 mol) (fluoren-2-ylthio)-pentyl-malonic acid are heated at 140° for 2 hours. After cooling on room temperature the product is taken up with diluted sodium hydroxide solution and washed with ether. Then the aqueous solution is acidified with 2 N hydrochloric acid. The crude (fluoren-2-ylthio)-heptanoic acid precipitates in solid form. After recrystallisation from gasoline 0.62 g., 47% of the theoretical amount, of pure 2-(fluoren-2-ylthio)-heptanoic acid, M.P. 84–86°, are obtained.

In analogous manner are obtained:

from (fluoren-2-ylthio)-methyl-malonic acid the 2-(fluoren-2-ylthio)-propionic acid, M.P. 139–140° (from methanol/water);
from (fluoren-2-ylthio)-decyl-malonic acid the 2-(fluoren-2-ylthio)-dodecanoic acid, M.P. 81–83° (from methanol/water).

The substituted malonic acids used as starting materials can be obtained in the following way:

5.0 g. (0.0117 mol) (fluoren-2-ylthio)-pentyl-malonic acid diethyl ester are added to a solution of 2.5 g. potassium hydroxide in 100 ml. of a mixture prepared from 3 parts methanol and 1 part water and the whole is refluxed for 4 hours. Then the solvent is evaporated in vacuo and the crude dipotassium salt remaining as residue is taken up with water. The aqueous solution is extracted several times with ether and acidified with 2 N hydrochloric acid, whereupon the crude (fluoren-2-ylthio)-pentyl-malonic acid precipitates. The mixture is worked up and the product is purified as described in Example 14 for the preparation of (fluoren-2-yloxy)-pentyl-malonic acid.

The following are obtained analogously:

from (fluoren-2-ylthio)-methyl-malonic acid diethyl ester the 2-(fluoren-2-ylthio)-propionic acid, M.P. 139–140° (from methanol/water);
from (fluoren-2-ylthio)-decyl-malonic acid diethyl ester the 2-(fluoren-2-ylthio)-dodecanoic acid, M.P. 81–83° (from methanol/water).

EXAMPLE 16

5.0 g. (0.016 mol) of 2-(fluoren-2-yloxy)-heptanoic acid are dissolved in 100 ml. of methanol. To the obtained solution is added a solution of 0.25 g. (0.0125 mol) of lithium hydroxide in 100 ml. of methanol and the whole is refluxed for 10 minutes. The solvent is then evaporated off and the residue exhaustively extracted with ether and ethyl acetate. The lithium salt remaining is then dissolved in hot methanol, filtered and the filtrate concentrated by evaporation to dryness. Pure lithium salt, M.P. 275–277° is obtained (with decomposition).

EXAMPLE 17

1.0 g. (0.0032 mol) of 2-(fluoren-2-yloxy)-heptanoic acid is dissolved in 20 ml. of methanol. To the obtained solution are added 0.12 g. (0.003 mol) of carbonate-free sodium hydroxide and the whole is concentrated by evaporation to dryness. The residue is separated by extraction with ether from the starting material, whereupon the pure sodium salt remains, M.P. 330° (with decomposition). The yield is 1.0 g., 95.5% of theoretical value.

EXAMPLE 18

1.0 g. (0.00327 mol) of 2-(fluoren-2-yloxy)-heptanoic acid is dissolved in 20 ml. of methanol and this is added to a solution of 0.168 g. (0.00254 mol) of potassium hydroxide (86%) in 10 ml. of methanol. The clear solution is concentrated by evaporation to dryness and the residue well washed with ether. The crystals are dissolved in hot ethylacetate and filtered. After concentrating the filtrate by evaporation, the crystalline potassium salt of the 2-(fluoren-2-yloxy)-heptanoic acid is obtained.

EXAMPLE 19

0.4 g. of ca. (0.01 mol) are decomposed, with exclusion of $CO_2$, in 40 ml. of water. To the obtained calcium hydroxide suspension are added 6.8 g. (0.022 mol) of 2-(fluoren-2-yloxy)-heptanoic acid in 150 ml. of methanol and the mixture is heated for 10 minutes to boiling. After concentrating by evaporation to dryness, it is triturated with ether and well washed. The obtained residue is extracted with hot methanol, whereby the calcium salt of the 2-(fluoren-2-yloxy)-heptanoic acid remains as colourless crystals, M.P. 305° (decomposition).

The following prescriptions further illustrate the production of tablets and dragées:

EXAMPLE 20

1000 g. of 2-(fluoren-2-yloxy)-heptanoic acid or 2-(fluoren-2-ylthio)-heptanoic acid are mixed with 550 g. of lactose and 292 g. of potato starch. The mixture is moistened with an alcoholic solution of 8 g. of gelatine and granulated through a sieve. After drying, 60 g. of potato starch, 60 g. of talcum and 10 g. of magnesium stearate and 20 g. of highly dispersed silicon dioxide are mixed in and the mixture is pressed into 10,000 tablets, each weighing 200 mg.

EXAMPLE 21

100 g. of 2-(fluoren-2-yloxy)-heptanoic acid or α-(fluoren-2-yloxy)-cyclohexaneacetic acid are well mixed with 16 g. of maize starch and 6 g. of highly dispersed silicon dioxide. The mixture is moistened with a solution of 2 g. of stearic acid, 6 g. of ethyl cellulose and 6 g. of stearin in ca. 70 ml. of isopropyl alcohol and granulated through a sieve No. III (Ph. Helv. V). The granulate is dried for ca. 14 hours and then put through sieve No. II–IIIa. It is then mixed with 16 g. of maize starch, 16 g. of talcum and 2 g. of magnesium stearate and pressed into 1000 dragée cores. These are coated with a concentrated syrup of 2 g. of lacca, 7.5 g. of gum arabic, 0.15 g. of dyestuff, 2 g. of highly dispersed silicon dioxide, 25 g. of talcum and 53.35 g. of sugar, and dried. The obtained dragées each weigh 260 mg. and each contain 100 mg. of active substance.

EXAMPLE 22

The following prescription further illustrates the production of suppositories:

A suppository mixture is prepared from 10.0 g. of 2-(fluoren-2-yloxy)-heptanoic aicd or 2-((fluoren-2-ylthio)-heptanoic acid and 163.5 g. of adeps solidus, and from the mixture are poured 100 suppositories each containing 100 mg. of active substance.

What we claim is:
1. A compound of the formula

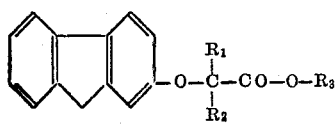

(I)

wherein
$R_1$ is straight or branched alkyl having from 3 to 10 carbon atoms, cycloalkyl having 5 to 7 ring members, or benzyl;
$R_2$ is hydrogen or methyl; or wherein both $R_1$ and $R_2$ are methyl;
$R_3$ is hydrogen or lower alkyl having 1 to 3 carbon atoms; and an alkali or alkaline-earth metal salt thereof when $R_3$ is hydrogen.

2. A compound according to claim 1, wherein $R_1$ is n-pentyl, and $R_2$ and $R_3$ are hydrogen.

3. A compound according to claim 1, wherein $R_1$ is n-hexyl, and $R_2$ and $R_3$ are hydrogen.

References Cited
FOREIGN PATENTS
916,242  1/1963  Great Britain.

LORRAINE A. WEINBERGER, Primary Examiner
J. F. TEROPANE, Assistant Examiner

U.S. Cl. X.R.

260—399, 410.9, 413 F, 465 F, 465 D, 470, 487, 520, 559 B, 465.4; 424—303, 308, 317, 318